Patented July 20, 1948

2,445,378

UNITED STATES PATENT OFFICE 2,445,378

ALKOXYPOLYOLEFIN POLYMERS AND PROCESS OF MAKING SAME

David W. Young, Roselle, and Norman M. Elmore, Elizabeth, N. J., assignors to Standard Oil Development Company, a corporation of Delaware No Drawing. Application July 22, 1943, Serial No. 495,764

14 Claims. (Cl. 260—92.6)

1

This application relates to olefinic polymers and relates particularly to an interpolymer of an unsaturated ether or alkoxypolyolefin, and relates especially to an interpolymer of an isoolefin and an unsaturated ether in the form of an alkoxyprene.

It has been found possible to polymerize mixtures of an isoolefin such as isobutylene with a polyolefin such as butadiene, isoprene, piperylene, and the like, to yield relatively high molecular weight polymers which are reactive with sulfur in a curing reaction to yield a very valuable rubber substitute. In the making of these polymers it has been found convenient to inactivate the catalyst after the polymerization reaction was completed by treatment of the polymer with an alkaline substance such as soda ash or lime in warm water, and it has been found that the lower alcohols and ethers, and, in fact, a wide range of oxygenated organic compounds are similarly effective for inactivating the catalyst, whether in water or solvent or slurry form, and it has been considered that the presence of organic oxides of any sort were fatal to the polymerization reaction because of their tendency to inactivate the catalyst.

It is now found, however, that the alkoxy substituted polyolefins or alkoxypolyolefins, which are in effect compound ethers, do not inactivate the catalyst with sufficient speed to halt the reaction, but that instead they are polymerized alone, or with other olefins, by a low temperature reaction to yield a new, and valuable, type of polymer which is a good rubber substitute. These materials are broadly the alkoxypolyolefins and the group as a whole are useful in varying degrees for the present invention. Broadly, the group has at least 5 carbon atoms per molecule, one oxygen atom; and two double linkages in one half of the ether. The maximum carbon atom number per molecule, as far as present information indicates, is to be found in the neighborhood of 12 or 14 or 15 carbon atoms per molecule. The preferred compounds are the conjugated alkoxypolyenes generally, and especially the alkoxyprenes, i. e. the alkoxy-2-butadienes 1,3; but the condition of conjugation is not necessary for the reaction. It merely makes the copolymerization somewhat more easy.

Accordingly, an object of the invention is to polymerize an alkoxypolyene, and to copolymerize an isoolefin such as isobutylene with an alkoxypolyene such as 2-methoxy butadiene, 1-3 by the application thereto at low temperature of a Friedel-Crafts catalyst, to yield a high molecular weight polymer which is reactive with sulfur in a curing reaction to produce a material having a substantial tensile strength and a good elongation. Other objects and details of the invention will be apparent from the following description:

2

In practicing the invention, a mixture is prepared consisting of an isoolefin which is preferably isobutylene, but may be other isoolefins up to 7 or 8 carbon atoms per molecule including such substances as 2-methyl butene 1, or 2-methyl pentene 1, or 2-methyl hexene 1, or the like, with an alkoxy substituted polyolefin derived from such polyolefins as butadiene, isoprene, piperylene, dimethyl butadiene, myrcene, dimethallyl, and the like, by the substitution thereinto of such alkoxy substituents as the meth-oxy group, the eth-oxy group, the prop-oxy group, the but-oxy group, and the like, substantially any of the polyolefins having from 4 to 14 carbon atoms per molecule being useful. These alkoxy substituted diolefins or alkoxydienes may have for the substituent any one of a wide range of alkyl radical substituents. The methoxy substituent is preferred; the ethoxy substituent is just about as satisfactory; the propoxy substituent is also useable. The butoxy substituent tends strongly to poison the polymerization reaction and requires a specially potent catalyst, and specially low temperatures, and even then does not always yield a solid or curable polymer. The still higher alkoxy substituents are similarly useable and in some ways superior to the butoxy substituent. Of the above-suggested alkoxypolyolefins, we prefer to use conjugated monoalkoxy-2-polyolefins having a total of from 5 to 13 carbon atoms, as exemplified by methoxy-2-butadiene-1,3 and propoxy-2-myrcene, and we prefer to use especially the alkoxyprenes or conjugated monoalkoxy-2-diolefins of 5 to 7 carbon atoms as exemplified by methoxy-2-butadiene-1,3 or propoxy-2-butadiene-1,3.

In the preparation of these mixtures for polymerization, the isoolefin, or isobutylene, is preferably present in major proportion with the alkoxypolyene or alkoxydiene present in minor proportion; the most satisfactory range of proportions being from 75 to 99 parts of the isoolefin with 25 parts to one part (by weight) of the alkoxypolyene or alkoxydiene. Alternatively, however, a useful range of proportions lies between a significant amount of one (which lies at approximately 1% to ½%) with 99 or 99½% of the other.

Alternatively also the alkoxypolyolefin may be copolymerized with various other simple polyolefins such as butadiene, isoprene, piperylene, dimethyl butadiene, and the like, at temperatures ranging from —10° C. or —20° C. to —164° C. by similar Friedel-Crafts type catalysts to yield other forms of synthetic rubber substances having relatively considerably higher iodine numbers (according to the Wijs method) but similar molecular weight ranges.

Also, the alkoxypolyenes may be polymerized alone by a similar low temperature polymerization procedure with Friedel-Crafts type catalysts to yield other valuable polymers. However, in polymerizing the alkoxypolyenes alone, they react only with considerable difficulty and the resulting polymers tend to be oily in character with molecular weights ranging from 400 or 500 to a few thousand; that is, they polymerize easily enough to stages above the degree of dimer, trimer and tetramer, but do not polymerize readily into rubbery bodies. However, these low molecular weight polymers are excellent softeners and plasticizers for the butadiene polymer and interpolymers with styrene and acrylonitrile known as buna and, with sulfur, they intercure with the bunas to yield a cured material of superior properties; particularly with the acrylonitrile interpolymer in which they enhance its oil resistance and, both because of their oxygen content and the intercuring, they are plasticizers which can not be extracted from the vulcanizate by solvents.

With any of these various forms of the invention, the olefinic mixture is preferably cooled to a temperature ranging from —20 to —164° C. and is then treated at the desired low temperature with a Friedel-Crafts catalyst which may be aluminum chloride in solution in ethyl or methyl chloride or carbon disulfide, or may be other Friedel-Crafts type catalysts such as are disclosed by N. O. Calloway in his article on "The Friedel-Crafts Synthesis" prepared in the issue of "Chemical Reviews" published for the American Chemical Society at Baltimore in 1935, in Volume XVII, No. 3, the article beginning on page 327, the list being particularly well shown on page 375. Alternatively, various modified Friedel-Crafts catalysts may be utilized. The catalyst as selected from the Calloway list may be dissolved in substantially any of the lower mono- or polyalkyl halides which have freezing points below about 0° C., thereby being low-freezing solvents, and it is found that these low-freezing organic halides do not form stable complexes with aluminum chloride or the other Friedel-Crafts catalysts. Alternatively, various modifications of the metal halide catalyst are possible including the double halides or the hydrated or hydroxylated metal halides and the like, some of which are sufficiently soluble in the lower hydrocarbons such as liquid propane, butane, pentane, and the like, to form satisfactory catalysts.

The catalyst solution is preferably added rapidly to the cold olefinic mixture by such procedures as stirring a stream of the catalyst solution into the olefinic mixture by powerful stirring, or by applying the catalyst solution as a spray to the surface of the rapidly stirred olefinic mixture, or the like.

The polymerization reaction proceeds rapidly to yield a solid polymer and the reaction may desirably be carried to a stage of from 50% to 95% of completion. When the desired stage in the reaction is reached, the catalyst is preferably inactivated by mixing the reaction material with such substances as warm water, warm soda ash solution, lime slurry, alcohol, or the like, which procedure simultaneously brings the polymer up to approximately room temperature, and, in addition, volatilizes out most of the unreacted material.

The reaction mixture is conveniently cooled by a refrigerating jacket on the polymerizer containing a convenient refrigerant such as liquid ethylene, liquid ethane, liquid propane, preferably under vacuum, or the like, or the reaction mixture may be cooled by a diluent-refrigerant added directly to the olefinic material, such as liquid ethylene, or liquid ethane, or liquid propane, or even liquid methane, depending upon the temperature desired, which, in turn, may be readily controlled by variation of the pressure in the reactor. Alternatively, the reaction mixture may be cooled by the direct addition of solid carbon dioxide, or by other methods which will be obvious to those skilled in the art.

When the polymer has been brought up to room temperature, it is conveniently dried either in a drying oven, or on the roll mill, and it is preferably hot milled to drive out as much as possible of the last traces of unpolymerized material and diluent or diluent refrigerant, if any were used. The polymer is then ready for compounding and curing or other uses, as desired.

EXAMPLE 1

A mixture was prepared consisting of approximately 985 parts by weight of isobutylene of 96% purity and 15 parts by weight of 2-methoxy butadiene having the type formula

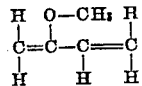

This material was mixed with 1000 parts by weight of powdered solid carbon dioxide to bring the temperature down to approximately —78° C. When this temperature was reached, a catalyst consisting of 0.93 percent of the double salt of aluminum bromo chloride ($Al_2Br_5Cl$) dissolved in liquid butane was prepared. Approximately 30 parts by weight of this catalyst solution were added to the olefinic mixture, well stirred in, and the material allowed to stand. At the end of two hours, approximately 47% of the olefinic material had polymerized to a solid polymer. The mixture was dumped into an excess of warm soda ash solution which volatilized out the unpolymerized components and removed the catalyst. The polymer was then washed in clear water and milled to plasticity.

The polymer was then compounded according to the following recipe:

| | Parts |
|---|---|
| Copolymer | 100 |
| Stearic acid | 5 |
| Zinc oxide | 5 |
| Carbon black | 50 |
| Sulfur | 3 |
| Tuads (tetra methyl thiuram disulfide) | 1 |

This material was then placed in molds and cured for a time and temperature, as shown in the following Table 1. The material was then evaluated for modulus, tensile strength and elongation at break, as shown, to yield the numerical values listed:

Table 1

| Cure Time | Cure Temp. | Modulus at 300% Elongation | Tensile | Elongation |
|---|---|---|---|---|
| Minutes | °F. | | Lbs./Sq. In. | Per cent |
| 30 | 307 | 412 | 1,515 | 710 |
| 45 | 307 | 400 | 1,705 | 710 |
| 60 | 307 | 452 | 1,485 | 610 |

The material was found to have a Mooney plasticity of 37 at 100° C. The material was capable of being extruded, before curing, although the extruded material was rather rough.

After curing, the cured material was tested in a Goodrich flexometer, as shown in the article by J. P. Haworth and F. P. Baldwin published in Industrial and Engineering Chemistry, Volume 34, page 1301 (November 1942). Upon evaluation for the flexometer data, the results in Table 2 were obtained.

Table 2.—Flexometer data (tread stock evaluation)

Heat buildup (run started at 25° C.____°C__  63.6
Load _____lbs__  148
Stroke _____inches__  0.125
Dynamic draft_____  0.109
Appearance _____  [1] #2

[1] Slightly-porous.

The results of Tables 1 and 2 show this polymer to be an excellent rubber substitute.

EXAMPLE 2

A similar reaction was conducted utilizing 970 parts by weight of isobutylene of approximately 96% purity with 30 parts by weight of 2-methoxy butadiene. This mixture was cooled in a jacketed reactor with approximately 1000 parts by weight of pulverized solid carbon dioxide (ground to pass 100% through a ten mesh to the inch sieve). When the olefinic mixture was reduced to a temperature of —78° C., the catalyst was stirred in. The catalyst consisted of approximately 12 parts by weight of a 1.75% solution of aluminum chloro bromide ($Al_2Br_5Cl$) in liquid butane. The reaction mixture was allowed to stand and at the end of three hours, approximately 30% had polymerized into a solid polymer. The solid polymer was removed, brought up to room temperature in warm water, washed, and dried on the mill. The solid polymer was then compounded according to the recipe given in Example 1, cured, and tested as in Example 1, to yield the results shown in Table 3.

Table 3

| Cure Time | Cure Temp. | Modulus at 300% Elongation | Tensile | Elongation |
|---|---|---|---|---|
| Minutes | °F. |  | Lbs./Sq. In. | Per cent |
| 15 | 307 |  | 697 | 700 |
| 30 | 307 | 235 | 1,125 | 590 |
| 60 | 307 | 507 | 1,315 | 360 |
|  |  | 787 |  |  |

This material showed a Mooney plasticity of 19 and could be extruded at the rate of 45 inches per minute, although at this extrusion rate the extruded material was quite rough.

The methoxy butadiene used in the above examples was prepared according to the method of A. A. Petrov, originally published in "Acta Univ. Voronegiensis," 8, No. 4, 63–67 (1935) and 68–74 (1935), as shown in Chemical Abstracts, Volume 32, page 6616. The procedure used consisted in mixing into butadiene a mixture of methyl alcohol containing approximately 2% to 15% of special, freshly precipitated mercuric oxide, as shown in the abstracts. When the mixture of butadiene and methyl alcohol had been prepared at a temperature of approximately —10° C., approximately 1% to 30% by weight of the total material of iodine was added. This step yielded 1-iodo-2-methoxy-butene-3. This material was then treated with alcoholic potash (exothermic reaction) and the resulting potassium iodide removed. This second step yielded the desired 2-methoxy-butadiene-1,3.

The 2-methoxy butadiene-1,3 prepared by this procedure showed a boiling point at a pressure of 760 millimeters of mercury of 74° to 74.5° C.; showed a density at 15° of 0.830 and a refractive index for the D line of 1.448; these values indicated a purity of approximately 99%.

This reaction proceeds equally well using ethyl alcohol to yield ethoxy butadiene which polymerizes nearly as well as the methoxy butadiene above outlined to yield similar high molecular weight polymers which, however, cure with somewhat greater difficulty requiring very powerful accelerators for sulfur curing. Propyl alcohol works similarly in this reaction and the resulting propoxy butadiene copolymerizes similarly to yield a polymer which also cures with sulfur although not as readily as the methoxy substituted copolymer. Similarly other diolefins may be used in this method such as isoprene, pentadiene, and the like. These examples are representative of the entire series, all of which copolymerize more or less readily depending upon the catalyst used and the temperature of polymerization to yield copolymers which are more or less readily curable with sulfur or with para quinone dioxime substances to yield good rubber substitutes. It may be noted that the higher compounds, whether of the higher diolefins or the higher methoxy substituents, show a relatively low solubility in the isoolefin at the very low temperatures of polymerization required for the higher alkoxypolyenes or, and accordingly it is usually desirable to have present a co-solvent for the isobutylene and the alkoxypolyene; such substances as ethyl or methyl or propyl or butyl mono- or polychloride being useful, and also such substances as carbon disulfide and its analogs and homologs as well as many other substances which will be obvious to those skilled in the art.

EXAMPLE 3

A mixture was prepared consisting of 970 parts by weight of 99% pure isobutylene, 15 parts by weight of isoprene of 96% purity and 15 parts by weight of 2 methoxy butadiene 1–3 of approximately 99% purity. This mixture was cooled in a polymerization reactor by the addition of approximately 1000 parts by weight of solid carbon dioxide (ground to pass 100% through a 10 mesh to the inch sieve). When the mixture had reached a temperature of approximately —78° C., the catalyst was added with vigorous stirring. The catalyst consisted of 20 parts by weight of 0.96% solution of aluminum chloro bromide ($AlClBr_2$) in liquid butane. The reaction mixture was allowed to stand and at the end of three hours, approximately 59% of the olefinic material had polymerized into a solid polymer.

The solid polymer was removed from the reaction mixture, dumped into warm water to bring it up to room temperature, and simultaneously volatilizes residual traces of reactants and inactivates the catalyst; then washed and dried on the open roll mill. The solid polymer was then compounded according to the recipe given in Example 1, cured and tested as in Example 1, to yield the following inspection data, as shown in Table 4.

Table 4

| Cure Time | Cure Temp. | Modulus at 300% Elongation | Tensile | Elongation |
|---|---|---|---|---|
| Minutes | °F. |  | Lbs./Sq. In. | Per cent |
| 60 | 307 | 621 | 1,830 | 715 |

These results show the value of a complex polymer containing in addition to the isobutylene both a simple polyolefin and an alkoxypolyene or, more specifically an alkoxyprene.

A considerable range of combinations of this type is possible, utilizing for the simple polyolefins such substances as butadiene, isoprene, piperylene, dimethyl butadiene, myrcene, dimethallyl, and the like, substantially any of the polyolefins having from 4 to 12 or 14 carbon atoms per molecule being useful for this purpose. Similarly, the presence of these simple polyolefins strongly modifies the course of the polymerization reaction, thereby improving the copolymerization of the alkoxypolyolefins, which likewise may be substantially any alkoxypolyolefins having from 5 to about 15 carbon atoms per molecule. In this instance also the lower solubility of the higher molecular weight alkoxypolyolefins makes the presence of a co-solvent desirable for the reaction.

EXAMPLE 4

A mixture was prepared consisting of 985 parts by weight of isobutylene of approximately 99% purity with 15 parts by weight of 2 ethoxybutadiene 1,3 of approximately 99% purity, and to the mixture there was added approximately 470 parts by weight of solid carbon dioxide (pulverized to pass through a 10 mesh sieve). When the mixture had reached a temperature of approximately $-78°$ C., the polymerization catalyst was added and vigorously stirred into the mixture. The catalyst consisted of 20 parts by weight of a solution of aluminum dichloro bromide ($AlCl_2Br$) in methyl chloride in 0.52% concentration. The reaction mixture was allowed to stand for thirty minutes at the low temperature, at the end of which time approximately 78% of the olefinic material had polymerized into a solid polymer. The solid polymer was removed from the reaction mixture and dropped into warm water to bring it up to room temperature and simultaneously volatilize out as much as possible of the residual traces of unpolymerized reactants, and to inactivate the catalyst. The solid polymer was then washed and dried on the roll mill.

The 2-ethoxy butadiene was prepared by the Petrov method, as above described, and had a boiling point of 92 to 94° C. at 760 mms. of mercury, a density at 15° C. of 0.822 and an index of refraction for the D line of 1.443 showing that the purity was close to 99%.

The molecular weight of the polymer was determined by the Staudinger method and found to be approximately 21,000.

Equal parts by weight of this polymer and of simple polyisobutylene having a molecular weight (by the Staudinger viscosity method) of 88,300 were mixed and compounded according to the following mixture:

| | Parts |
|---|---|
| Interpolymer of isobutylene and 2 ethoxy butadiene | 50 |
| Simple polyisobutylene | 50 |
| Zinc oxide | 5 |
| Stearic acid | 3 |
| Sulfur | 2 |
| Carbon black (Cabot No. 9) | 10 |
| Tuads (tetramethyl thiuram disulfide) | 0.5 |

This compound was prepared on the open roll mill and the compound was placed in molds and cured. The cured material was then evaluated for tensile strength and elongation at break to yield the inspection record shown in Table 6.

Table 6

| Cure Time | Cure Temp. | Tensile | Elongation |
|---|---|---|---|
| Minutes | °F. | Lbs./Sq. inch | Percent |
| 60 | 307 | 860 | 380 |

Before compounding, the simple polymer was found to have a Mooney plasticity of 6 at 100° C. The inspection values in Table 6 show that the interpolymer of isobutylene with 2 ethoxy butadiene is compatible with simple polyisobutylene to yield a rubber of good tensile strength and good elongation.

The copolymer is similarly compatible with a considerable range of other polymers including such substances as the low temperature copolymer of isobutylene with the simple polyolefins as above mentioned; with natural rubber; with the bunas including simple polybutadiene and the copolymers of butadiene with styrene and with acrylonitrile; and with various other of the polymers. The material is an excellent plasticizer for various of the other polymers which tend to be brittle and inelastic, and can be intercured with the bunas or butadiene type polymers by means of sulfur.

EXAMPLE 5

A mixture was prepared consisting of 985 parts by weight of 2-methyl pentadiene and 15 parts of 2 methoxy butadiene 1-3. This mixture was then mixed with 6000 parts by weight of liquid ethylene in a heat insulated reactor, bringing the temperature well down towards $-103°$ C. When the desired low temperature, lying between $-96°$ C. and $-103°$ C. was reached, the catalyst was added and well stirred in. The catalyst consisted of approximately 15 parts by weight of a solution of aluminum chloro bromide ($AlCl_2Br$) in liquid methyl chloride. The reaction mixture was allowed to stand for 45 minutes, at the end of which time approximately 54% of the methyl pentadiene and methoxy butadiene had interpolymerized into a solid polymer.

The solid polymer was removed, dumped into warm water to bring it to room temperature, washed and dried on the mill.

The solid polymer was then compounded according to the recipe given in Example 1, cured in molds and tested, as in Example 1, to yield the inspection data shown in Table 7.

Table 7

| Cure Time | Cure Temp. | Modulus at 300% Elongation | Tensile | Elongation |
|---|---|---|---|---|
| Minutes | °F. | | Lbs./Sq. In. | Per cent |
| 30 | 307 | 720 | 1420 | 820 |
| 60 | 307 | 830 | 1370 | 960 |

The inspection data of Table 7 shows that 2 methoxy butadiene 1,3 copolymerizes satisfactorily with 2 methyl pentadiene to yield an excellent rubber having a good tensile strength and a good elongation.

Example 5 uses a hexadiene but various other of the polyolefins, especially the higher polyolefins, may be substituted for the methyl pentadiene to yield similarly useful and valuable copolymers.

Thus the present invention provides a new type of copolymerization utilizing a mixed ether of a polyolefin which is reactive with sulfur in a curing reaction to yield a material of good tensile strength (1800 lbs.) with an elongation at break ranging from 460 to 715%; which material is an excellent substitute for rubber in substantially all of its uses.

While there are above disclosed but a limited number of embodiments of the process and product of the invention, it is therefore desired that only such limitations be imposed on the appended claims as are stated therein or required by the prior art.

The invention claimed is:

1. A copolymer from between 99.5% and 0.5% of an isomonoolefin having 4 to 8 carbon atoms per molecule and 0.5% to 99.5% of a conjugated monoalkoxy-2-diolefin of 5 to 13 carbon atoms per molecule and having 1 to 3 carbon atoms in the alkoxy substituent.

2. A copolymer from between 99.5% and 75% of isobutylene and from between 0.5% and 25% of a monoalkoxy-butadiene-1,3 having an alkoxy substituent of 1 to 3 inclusive carbon atoms in the 2-position and a total of from 5 to 7 carbon atoms per molecule.

3. The method of preparing a copolymer comprising the steps of mixing 99.5% to 75% of an isomonoolefin having 4 to 8 carbon atoms per molecule with about 0.5% to 25% of a conjugated monoalkoxy-2 polyolefin of 5 to 13 total carbon atoms per molecule and having less than 4 carbon atoms in the alkoxy substituent, cooling the mixture to a temperature within the range between −10° C. and −164° C., and adding thereto a Friedel-Crafts catalyst dissolved in a non-complex-forming, organic solvent which is liquid in the mixture at the polymerization temperature.

4. The polymerization process comprising the steps of mixing isobutylene with a conjugated monoalkoxy-2-polyolefin of 5 to 13 carbon atoms per molecule and having less than 4 carbon atoms in the alkoxy substituent, in the proportion of at least 0.5% of one monomeric ingredient with up to 99.5% of the other, cooling the mixture to a temperature within the range between −10° C. and −164° C., and polymerizing the cold mixture by the application thereto of a Friedel-Crafts catalyst comprising an aluminum halide in solution in a non-complex-forming, organic solvent which is liquid in the mixture at the reaction temperature.

5. The polymerization process comprising the steps of mixing a major proportion of isobutylene with a minor proportion, equal to at least 0.5% of the total polymerizable material present, of a conjugated monoalkoxypolyolefin having 5 to 13 carbon atoms per molecule and having an alkoxy group of less than 4 carbon atoms substituted in the 2-position, cooling the mixture to a temperature within the range of −10° C. and −164° C., and polymerizing the cold mixture by the application thereto of a Friedel-Crafts catalyst comprising aluminum chlorobromide in solution in propane.

6. An olefinic copolymer of 99.5% to 0.5% isobutylene and of 0.5% to 99.5% of methoxy-2-butadiene 1,3.

7. An olefinic copolymer of 99.5% to 75% isobutylene and 0.5% to 25% of ethoxy-2-butadiene-1,3.

8. A copolymer of a major proportion of an isomonoolefin having 4 to 7 carbon atoms per molecule with about 0.5% to 25% of a conjugated monoalkoxy-2-polyolefin having 5 to 13 total carbon atoms per molecule and 1 to 3 carbon atoms in the alkoxy substituent.

9. An olefinic tripolymer of a major proportion of isobutylene, a minor proportion of isoprene, and at least 0.5% of methoxy-2-butadiene-1,3.

10. The polymerization process comprising the steps of mixing a major proportion of isobutylene with a minor proportion of a conjugated polyolefin having from 4 to 10 carbon atoms per molecule, and at least 0.5% of a conjugated monoalkoxy-2-diene having a total of 5 to 13 carbon atoms per molecule and 1 to 3 carbon atoms in the alkoxy group, cooling the mixture to a temperature within the range of −10° C. and −164° C., and polymerizing the refrigerated mixture by the addition thereto of a Friedel-Crafts catalyst dissolved in an organic, non-complex-forming solvent which is liquid at the reaction temperature, to yield a triple-component interpolymer.

11. The polymerization process comprising the steps in combination of mixing isobutylene in major proportion with a minor proportion of isoprene and at least 0.5% of 2-methoxy butadiene-1,3, cooling the mixture to a temperature of approximately −78° C., polymerizing the mixture by the addition thereto of a Friedel-Crafts catalyst in solution in a low-freezing, non-complex-forming organic solvent which is liquid in the mixture at the polymerization temperature to yield a solid polymer which is reactive with sulphur and forms a cured material having a substantial tensile strength and a substantial elongation at break.

12. The polymerization process comprising the steps in combination of mixing 99.5 to 0.5% of isobutylene with between 0.5 and 99.5% of 2-methoxy butadiene-1,3, cooling the resulting mixture to a temperature within the range of −20° C. to −164° C., adding to the cold mixture a Friedel-Crafts catalyst in solution in a low-freezing, non-complex-forming organic solvent which is liquid in the mixture at the polymerization temperature and thereby polymerizing said mixture to yield a solid polymer.

13. The polymerization process comprising the steps in combination of mixing isobutylene in major proportion with at least 0.5% of 2-ethoxy-butadiene-1,3, cooling the mixture to a temperature within the range of −20° C. to −164° C. and adding to the cold mixture a Friedel-Crafts catalyst in solution in a low-freezing, non-complex-forming organic solvent which is liquid in the mixture at the polymerization temperature, and thereby polymerizing the cold mixture to yield a solid polymer.

14. The process of producing rubbery materials which comprises mill-mixing a copolymer of a major proportion of isobutylene and of at least 0.5% of 2-ethoxy butadiene-1,3 with an equal weight of solid polyisobutylene polymer and with an amount of sulphur equal to 2% by weight of total polymers, and thereafter heat-curing the resulting mixture at 307° F.

DAVID W. YOUNG.
NORMAN M. ELMORE.

REFERENCES CITED

The following references are of record in the file of this patent:

UNITED STATES PATENTS

| Number | Name | Date |
|---|---|---|
| 2,189,529 | Carothers et al. | Feb. 6, 1940 |
| 2,344,085 | Halbig | Mar. 4, 1944 |

(Other references on following page)

FOREIGN PATENTS

| Number | Country | Date |
|---|---|---|
| 703,582 | Germany | Mar. 12, 1941 |
| 513,521 | Great Britain | Oct. 16, 1939 |

OTHER REFERENCES

Calloway: article in Chem. Reviews, pages 327, 374–377, vol. 17 of 1935.

Burk et al.: "Polymerization," pages 70–80, published by Reinhold Pub. Co. N. Y. 1937.

Chemical Abstracts, vol. 32, pages 5370 and 6616 for 1938.